May 5, 1936.  C. W. LAMBERT  2,039,720
AUTOMATIC VARIABLE PITCH PROPELLER
Filed April 4, 1935  2 Sheets-Sheet 1
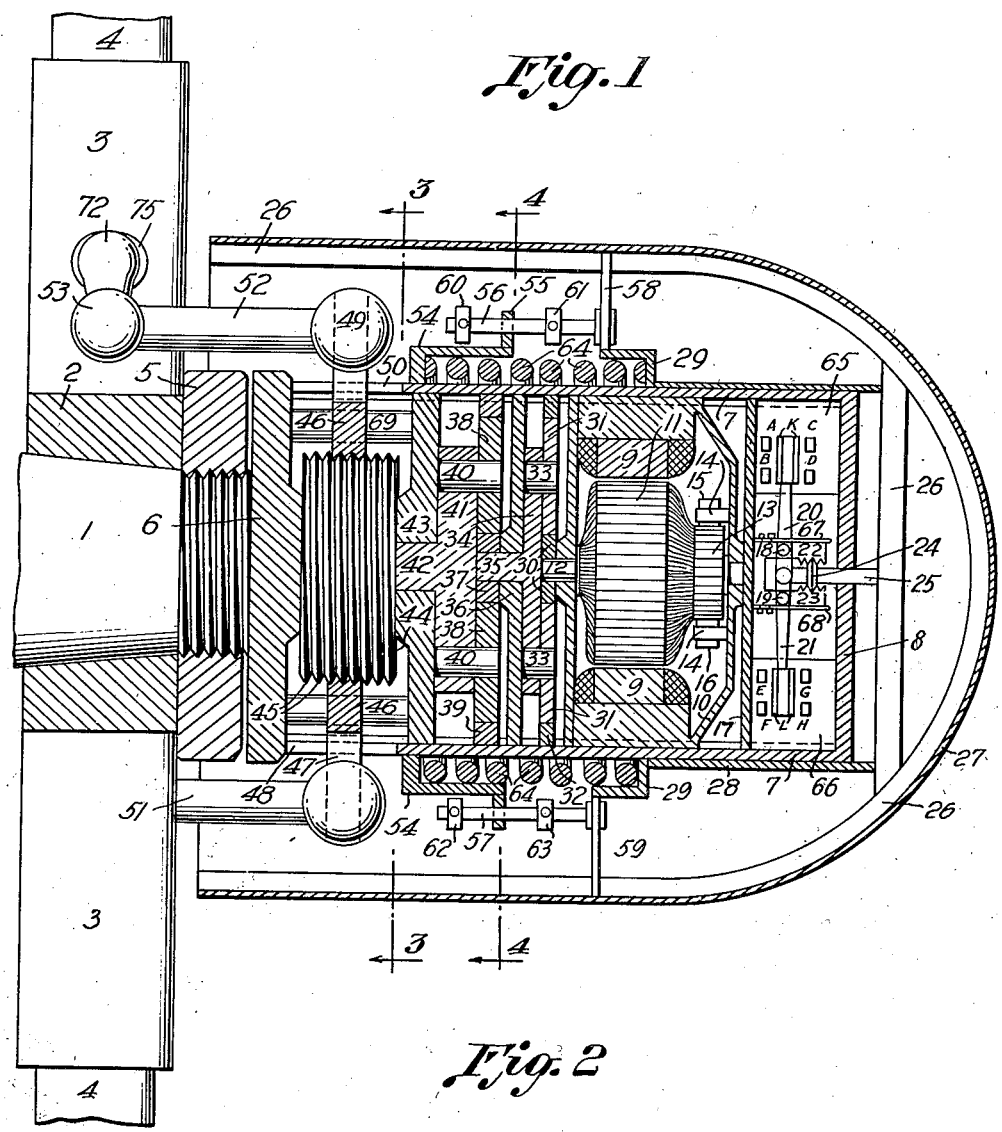
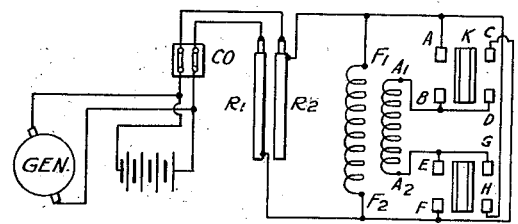
Inventor:
C. W. Lambert.

May 5, 1936.　　　C. W. LAMBERT　　　2,039,720
AUTOMATIC VARIABLE PITCH PROPELLER
Filed April 4, 1935　　2 Sheets-Sheet 2
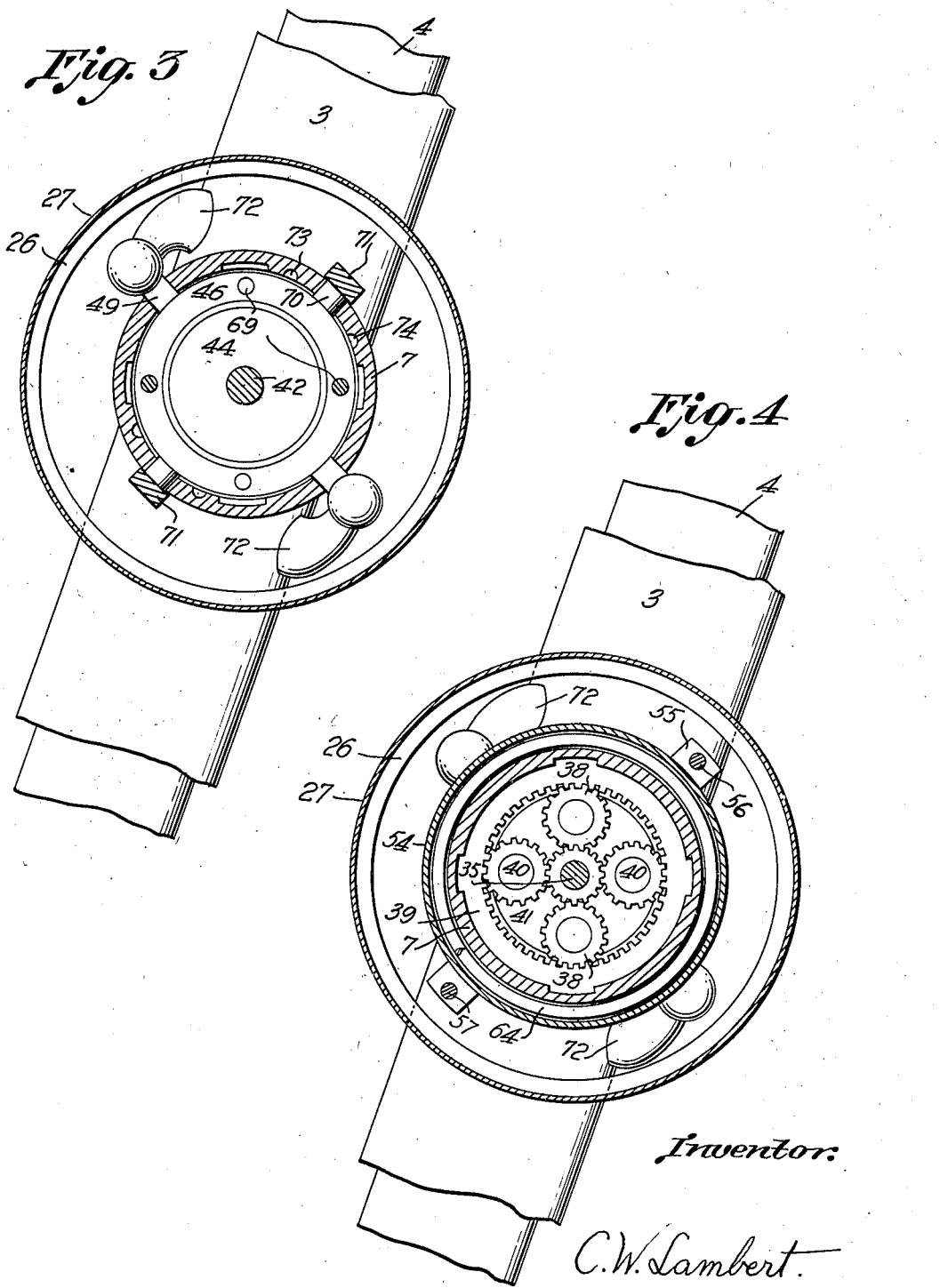
Inventor:
C. W. Lambert.

Patented May 5, 1936

2,039,720

UNITED STATES PATENT OFFICE 2,039,720

AUTOMATIC VARIABLE PITCH PROPELLER

Chandley William Lambert, Cleveland, Ohio

Application April 4, 1935, Serial No. 14,647

8 Claims. (Cl. 170—162)

The invention relates to automatic variable pitch propellers, in which the angular pitch of the blades is changed conformally to changes of airspeed of the plane. Fig. 1 is a longitudinal view in section showing the general arrangement of the various parts. Fig. 2 is a simplified diagram of the electrical control circuit. Figs. 3 and 4 are transverse views in section, along lines 3 and 4 of Fig. 1. Only half of each view is shown; the two halves of each view being balanced and similar.

Same parts are numbered alike in all views of the drawings. In Fig. 1, 1 is the main engine power shaft or propeller shaft, 2 is the hub, 3—3 are hub barrels in which propeller blade shanks 4—4 may rotate into positions of increased or decreased pitch, automatically controlled as hereinafter described. Nut 5 holds the hub 2 on shaft 1. To shaft 1 is secured frame 6, to which is secured tube 7, which is closed at the forward end by cap plate 8. 9—9 are motor field poles secured to frame 10 of the small electric motor, of which 11 is the armature, 12 the armature shaft, 13 the commutator, 14—14 insulated brush holders, and 15—16 commutator brushes.

To frame 17, secured in tube 7, are secured pivots 18—19 on which switch arms 20—21 may rotate through a limited arc. The inner ends of arms 20—21 are pivoted to push pull rod 25, to which is secured annular beveled stop 24, which cooperates with notched bars 22 and 23,—also pivoted at 18—19 and held against beveled collar 24 by springs 67—68.

Rod 25 is secured to frame 26 to which pressure plate 27 is secured. Tube 28, slidable on tube 7, is secured to frame 26 and annular ring 29. To armature shaft 12 is secured gear 30 which meshes with spaced gears 31—31, which mesh with internal ring gear 32, which is secured in tube 7. Gears 31—31 rotate on pins 33—33 secured to spider 34, to which is secured shaft 35 in bearing 36, which is secured in tube 7.

To shaft 35 is secured gear 37, meshing with spaced gears 38—38, which mesh with ring gear 39, secured in tube 7. Gears 38—38 rotate on pins 40—40 secured to spider 41 to which shaft 42 is secured. Shaft 42 rotates in bearing 43 which is secured in tube 7. To shaft 42 is secured drum 44 having external threads 45 which cooperate with internal threads of nut 46 which slides longitudinally on spaced rods 69 (Fig. 3).

To nut 46 are secured radial arms 47 and 49, which extend through closed slots 48—50 in tube 7,—one arm for each propeller blade.

To radial arms 47 and 49 are pivoted push-pull rods 51—52, pivoted, as at 53, to radial arm 72 which passes through closed slot 75 in hub barrel 3; arm 72 being secured to propeller blade shank 4.

Rotation of the motor armature in one direction moves the nut 46 to the right and increases the blade pitch, and vice versa.

Ring 54 is secured to nut 46, and may slide on tube 7; see also Fig. 3, as ring 54 contacts one end of compression spring 64. To ring 54 is secured flange 55, thru holes in which, rods 56—57 may slide. Adjustable stops 60—61 and 62—63 are secured to rods 56—57, which rods are secured to frames 58—59 which frames are secured to and move with sliding tube and ring 28—29, and frame 26, and pressure plate 27.

Fig. 2 shows a source of electrical energy, a generator or battery, a cutout, CO, insulated wires leading to insulated brushes contacting insulated collector rings $R_1$ and $R_2$, which may be located on the shaft 1 of Fig. 1, in the rear of the propeller hub 2. From collector rings $R_1$ and $R_2$ insulated wires lead to the field coils at $F_1$ and $F_2$ and to the switch contacts A—H and F—C. Contacts B—D and E—G are connected to the armature at $A_1$ and $A_2$. When switch contactor K contacts A—B, and switch contactor L contacts E—F, the motor turns in a direction to move the nut 46 to the left (Fig. 1) and decrease the pitch of the blades. When contactor K contacts C—D and L contacts G—H, the motor rotates in the reverse direction and increases the blade pitch.

In Fig. 3, to shaft 42 is secured drum 44; 46 is the nut slidable on rods 69—69; 49 the radial arm connected to a link and that to radial pitch arm 72. 3 is the hub barrel and 4 the blade shank. Radial arm 70—similar to 49—is secured to nut 46, and also slides in a closed slot in tube 7, and by push pull rod 71, is connected to ring 54 of Figs. 1 and 4. Grooves 73—74 are to receive the insulated wires leading forward from the collector rings to the electric motor and control switch.

In Fig. 4, to shaft 35 is secured gear 37, meshing with gears 38—38 on pins 40—40 secured to spider 41. Gears 38—38 mesh with ring gear 39 which is secured into tube 7. Outside of tube 7 are compression spring 64, ring 54, flange 55, and pitch limiting rod 57. 27 and 26 are the pressure plate and its supporting frame.

The invention, one form of which is shown in the accompanying drawings, consists of a restrictedly slidable pressure plate, upon which the air stream acts with a pressure which varies with each change of air speed. This pressure, which is a measure of the air speed, is transmitted to one end of a compression spring. The motion of a sliding nut, which changes its position with each change of blade pitch, is transmitted to the other end of the compression spring and this motion or pressure is a measure of the blade pitch at the instant pertaining. The nut is moved by an electric motor and reduction gear; and to the pressure plate is connected a motor switch operating rod which controls the reversing switch and consequently the direction of motor rotation. Adjustable stops, on rods paralleling the compression spring, open the switch when the upper or lower predetermined limit of pitch angle is reached, and prevent further action in that direction.

The power means is symmetrically balanced and the power control means is symmetrically located with reference to the axis of the shaft of the propeller.

I claim:

1. An automatic variable pitch propeller comprising a power shaft, a hub, rotatable blades, an electric motor, means for rotating said blades in reverse directions cooperating with said motor, pitch measuring means comprising a nut and compression spring cooperating with said motor and said blades, a longitudinally slidable pressure plate cooperating with said spring, and a reversing switch cooperating with said plate and said motor.

2. A propeller hub, propeller blades rotatable relatively to said hub, an electric motor cooperating with said blades for the purpose of rotating said blades into positions of greater or lesser pitch, pitch measuring means cooperating with said blades, air speed measuring means associated with said pitch measuring means, a reversing switch connected to said motor and cooperating with said air speed measuring means, adjustable means associated with said pitch measuring and said air speed measuring means for limiting the extent of rotation of said blades in reverse directions relatively to said hub.

3. A propeller hub, a rotatable blade shank associated with said hub, an electric motor, a sliding nut, means for transmitting motion in reverse directions to said nut and said shank from said motor, a movable pressure plate, flexible means associating said plate with said nut, control means cooperating with said plate for controlling the rotation of the armature of said motor in reverse directions.

4. A propeller hub, spaced blade shanks rotatable in reverse directions relatively to said hub, an electric motor secured coaxially with said hub, means for rotating said shanks by said motor, a reversing switch, an electric circuit comprising a source of electrical energy, cutout, insulated connecting wires, collector rings and brushes, and said switch and said motor, a movable pressure plate coaxial with said hub and said motor, said plate associated with said switch, a compression spring cooperating with said plate and said shank rotating means, means limiting the extent of rotation of said shank in reverse directions.

5. A propeller shaft, spaced rotatable blades associated with said shaft, an electrical motor, means cooperating with said motor for rotating said blades in reverse directions by said motor, air speed measuring means, motor control means cooperating with said air speed measuring means and said blade rotating means, means limiting the extent of rotation of said blades in reverse directions.

6. A propeller shaft, spaced propeller blade shanks cooperating with said shaft in such manner that said shanks may be reversibly rotated into positions of increased or decreased pitch, blade shank rotating means comprising an electric motor cooperating with said blade shanks, control means cooperating with said motor, airspeed measuring means cooperating with said motor control means, pitch measuring means cooperating with said air speed measuring means, means limiting the extent of action in reverse directions of said blade shank rotating means.

7. A power shaft, spaced rotatable propeller blades associated with said shaft, blade rotating means cooperating with said blades, blade pitch measuring means cooperating with said blade rotating means, symmetrically balanced power means cooperating with said blade rotating means, symmetrically located power control means cooperating with said power means, air speed measuring means cooperating with said control means and said blade pitch measuring means.

8. A propeller shaft, spaced reversibly rotatable blades associated with said shaft, a primary source of power, a secondary power unit cooperating with said blades, means connecting said primary and said secondary power unit, power control means associated with said connecting means for controlling the rotation in reverse directions of said blades by said secondary power unit, airspeed measuring means cooperating with said control means, blade pitch measuring means cooperating with said blades and said airspeed measuring means, blade pitch limiting means associated with said control means.

CHANDLEY WILLIAM LAMBERT.